Patented Oct. 2, 1934

1,975,415

UNITED STATES PATENT OFFICE 1,975,415

RUBBER HEADED VALVE STEM

Selden T. Williams, Bellerose, N. Y., assignor to A. Schrader's Son, Incorporated, Brooklyn, N. Y., a corporation of New York Application November 21, 1932, Serial No. 643,600

6 Claims. (Cl. 152—12)

My present invention relates to valve stems for inflatable bodies and the like, and aims to provide certain improvements therein. It also aims to provide a low cost valve stem and patch construction, by means of which the assembly of the valve stem and an inflatable body is facilitated, expedited and improved.

Primarily my invention is directed to valve stems for pneumatic tire tubes, which as now made from cylindrical stock require for their manufacture multiple heading operations with intermediate annealing operations, a shearing operation to provide the "flats" on the stem, a threading operation on the stem shank and inspection and gauging of the enlarged head. The assembly of the valve stem to a pneumatic tube requires insertion of the valve stem into the tube and fishing the stem through the patch hole, providing a bridge washer, a clamping nut and a rim nut, and the application of said parts onto the stem.

According to my present invention many of the foregoing steps in the manufacture and assembly of the valve stem and parts to a pneumatic tube are entirely dispensed with, and in lieu thereof the stem, the head of which may be formed by a single heading operation, can have said head embedded in a preformed patch and semi-cured therein, whereupon the valve stem and patch can be secured to an inner tube and the unit vulcanized in a single operation. The invention also embodies other features of novelty which will be fully understood from the detailed description which follows, when considered in conjunction with the accompanying drawings showing several embodiments of my invention, and wherein, Figure 1 is a longitudinal section through a valve stem embodying my invention.

Referring first to Figs. 1 to 6 of the drawings, let A indicate a valve stem formed from a rivet-like blank, the head $a$ of which (the foot portion of the valve stem) may be formed by a single heading operation or in any other manner. The other or top end of the valve stem is preferably externally screw-threaded, as indicated at $1a$, to accommodate a valve cap or pump coupling, and the interior of the stem is suitably bored and screw-threaded in the conventional manner. The valve stem A differs from the conventional tire valve stems now in use in that its shank is not formed with oppositely-disposed "flats" and threaded throughout its length, and its foot portion $a$ does not have to be free from imperfections nor be of a gauged diameter.

Figure 1:
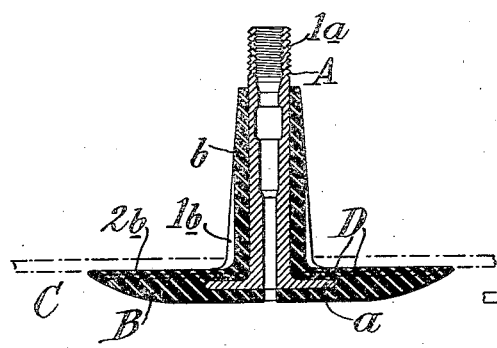

The foot portion of the valve stem is embedded in a substantially oval patch-like mass of rubber B, a portion $b$ of which extends upwardly and encircles the valve stem shank to a point in proximity to the nipple threads $1a$. The portion $b$ is preferably preformed to provide a substantially conical outer wall, with longitudinally-extending grooves $1b$ to permit venting of the air when mounting the tire and tube on a rim and for venting air and gases from the mold during curing. The valve stem A and patch B assembly of Fig. 1 is of the type wherein the valve stem must be inserted into and fished through an opening in the pneumatic tube so that the patch engages the inner wall of said tube, to which it is subsequently vulcanized. Accordingly the top face $2b$ of the patch, which is intended for engagement with the inner wall of the pneumatic tube C, is shown as being substantially flat and lying in a plane which is substantially parallel to the faces on the rivet head $a$. For reinforcing said patch there may be inserted therein during its formation and molding about the valve stem, a plurality of plies of fabric D.

Figure 3:
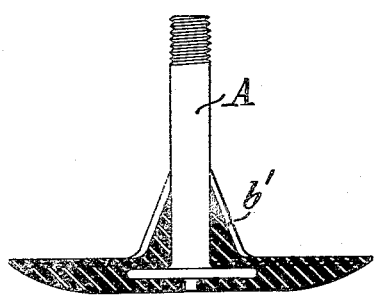
Fig. 3 is an elevation of a modified form of my invention, the patch being shown in section.

The valve stem and patch assembly illustrated in Fig. 3 is substantially similar to that shown in Fig. 1 and described in the preceding paragraph, the only difference between the two being that in Fig. 3 the portion $b'$ which engages around the shank of the valve stem A encircles said stem to a point substantially below the nipple end, and the conical wall of said patch portion is of greater angularity than is that of the patch of Fig. 1.

Figure 4:
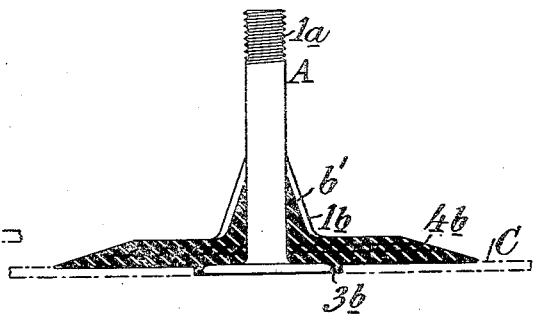
Fig. 4 is a view similar to Fig. 3 showing a further modification.
Figure 2:
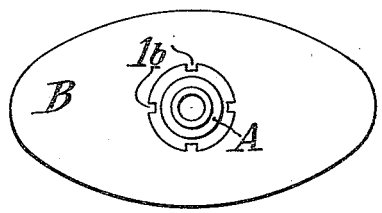
Fig. 2 is a top plan view of the valve stem shown in Fig. 1.
Figure 5:
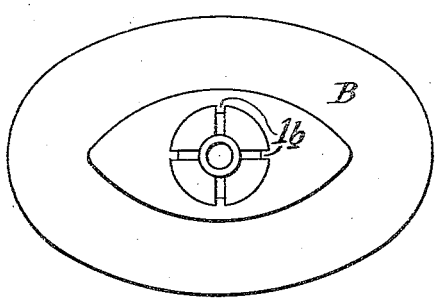
Fig. 5 is a top plan view of the valve stem shown in Fig. 4.

In Fig. 4 I have shown the valve stem and patch assembly of a form for attachment to the outer wall of an inner tube, whereby the insertion of the valve stem through the valve opening in a tube and the fishing of said stem through said opening can be dispensed with. In this embodiment of my invention the bottom face of the patch extends in substantially the plane of the top face of the foot portion, and has a portion 3b which engages around the peripheral wall of the foot portion to provide proper adhesive engagement with the inner tube C when the foot portion of the valve stem is inserted into the opening in the tube from the exterior thereof. The bottom face of the foot portion being not relied upon to provide adhesive engagement with the inner tube, it is not coated with rubber and thereby the danger of said rubber entering the bore of the valve stem and clogging the same is obviated. The top surface of the patch is chamfered, as shown at 4b, to provide a better seating within a rim or tire casing, and where said patch encircles the valve stem it is formed with a conical surface b' and grooves 1b, as hereinbefore described.

Figure 6:
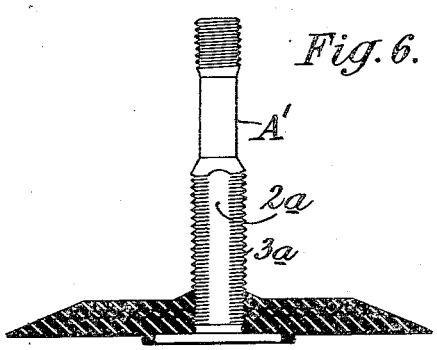
Fig. 6 is a view similar to Fig. 3 showing a still further modification.

In Fig. 6 I have shown an application of my invention to a valve stem A' which is provided with "flats" 2a and mutilated threads 3a. In this embodiment, the foot of the valve stem is embedded and held within the patch C in the same manner as that disclosed in Fig. 4. The screw-threads 3a being intended to accomodate a rim nut, it will be obvious that the patch does not extend upwardly around the valve stem shank to any appreciable degree.

Figure 7:
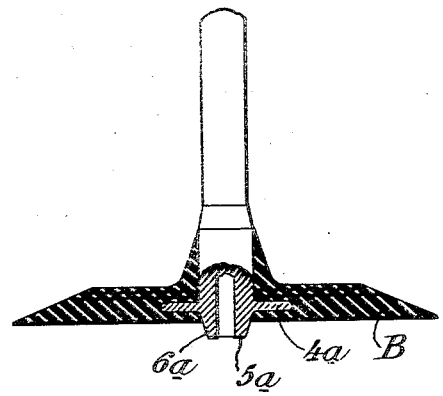
Fig. 7 is a view similar to Fig. 3 showing still another modification, the foot portion of the valve stem being shown in section.
Figure 8:
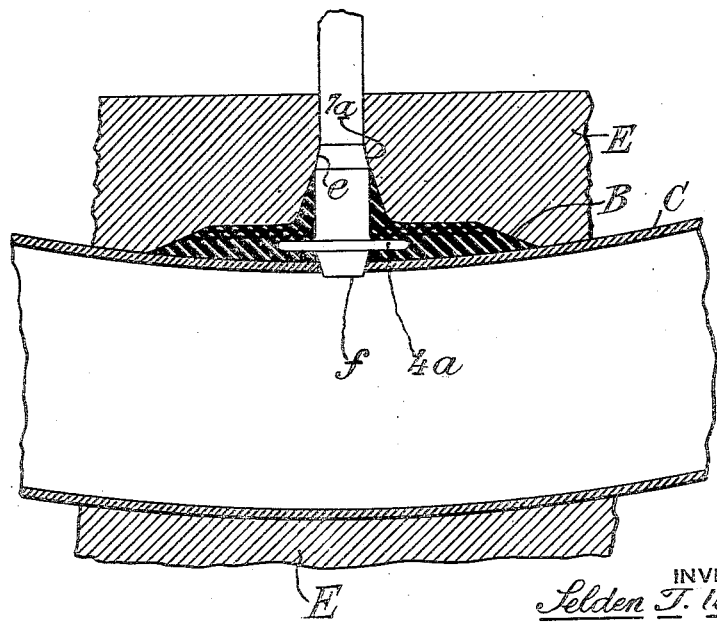
Fig. 8 is a section showing the manner in which the valve stem of Fig. 7 may be vulcanized to an inner tube.

In providing a valve stem and patch assembly such as disclosed in Figs. 1 and 3, it will be appreciated that means must be provided either on the mould or supplemental thereto for insuring an open passage through the patch for communication with the bore in the valve stem during the semi-curing of the patch onto the stem. Also in the embodiment shown in Figs. 4 and 6 it may be necessary to employ similar means to prevent any of the rubber from the inner tube or patch finding its way into the valve stem bore. To avoid the use of such passage insuring means and at the same time provide a valve stem and patch assembly adapted for either attachment to the inner or outer walls of a pneumatic tube, I provide the foot of the valve stem with a disk-like portion 4a, below which extends a projecting portion 5a provided with an external conical wall 6a. Preferably the disk-like portion 4a is wholly embedded within the rubber mass B, but the projection 5a should extend through said mass and beyond the tube-engaging face thereof a distance sufficient to insure against any rubber of the inner tube finding its way into the bore of the stem. Moreover, the valve stem can be more definitely located in the opening cut in the green tube by reason of the projection 5a. In Fig. 8 I have shown the manner in which the valve stem and patch assembly of Fig. 7 is to be positioned within a mould for attachment to the outer wall of an inner tube. The assembly is enclosed within a suitable mould E—E preferably of the watch-case type, and pressure is applied through the valve stem to inflate the tube within the mould and vulcanize the tube in situ. Complemental shoulders e and 7a may also be provided on the mould E and stem A respectively, for insuring proper alignment of the parts. It will be apparent that the valve stem and patch assembly of Fig. 7 will be equally well adapted for attachment to the inner wall of an inner tube by making the top face of the patch, the inner tube engaging face.

It will be apparent to those skilled in the art that in semi-curing the patch onto the valve stem the stem may be suitably treated to improve the adhesion of the metal of the stem and the rubber of the patch, or a suitable rubber cement may be employed to accomplish this end. It will also be apparent that the size, shape and the degree to which the patch surrounds the valve stem may be varied to suit any particular type of valve stem, and also that the amount of fabric or other reinforcement provided within the patch may be modified at will. Accordingly I do not wish to be limited to the details of construction disclosed since the same may be modified without departing from the spirit of the invention.

What I claim is:

1. A rubber headed valve stem comprising a rivet-like member, the head of which is embedded in a patch of rubber having a face adapted for attachment to the outer wall of an inflatable body, said rivet head end of the valve stem extending beyond the engaging face on the patch and being insertable into a valve stem opening in the inflatable body from the exterior thereof.

2. A rubber headed valve stem comprising a rivet-like member, the head of which is embedded in a patch of semi-cured rubber having a face adjacent the outer face of the rivet head adapted for attachment to an inflatable body, said rivet head having an extension adapted to extend into the inflatable body.

3. A rubber headed valve stem comprising a rivet-like member, the head of which is embedded in a patch of semi-cured rubber having a face adjacent the outer face of the rivet head adapted for attachment to an inflatable body, said rivet head having an axial conical extension adapted to extend into the inflatable body.

4. A rubber headed valve stem comprising a rivet-like member having a disk-like head and an axial extension beyond said head, said disk-like head being embedded in a patch of semi-cured rubber and the axial extension extending through said patch.

5. A rubber headed valve stem comprising a rivet-like member, the head of which is embedded in a patch of rubber having a face adjacent the outer face of the rivet head adapted for attachment to an inflatable body, and said rivet head having an extension adapted to extend into the inflatable body.

6. A rubber headed valve stem comprising a rivet-like member having a disk-like head and an axial extension beyond said head, said disk-like head being embedded in a patch of rubber and the axial extension extending through said patch.

SELDEN T. WILLIAMS.